United States Patent
Kim

(10) Patent No.: US 9,830,308 B2
(45) Date of Patent: Nov. 28, 2017

(54) RENDERING APPARATUS AND METHOD FOR OPERATING A WEB-PLATFORM

(71) Applicant: SAMSUNG ELECTRONICS CO., LTD., Suwon-si, Gyeonggi-do (KR)

(72) Inventor: Chang-yeon Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 164 days.

(21) Appl. No.: 14/589,338

(22) Filed: Jan. 5, 2015

(65) Prior Publication Data

US 2015/0193401 A1 Jul. 9, 2015

(30) Foreign Application Priority Data

Jan. 6, 2014 (KR) ........................ 10-2014-0001320

(51) Int. Cl.
*G06F 17/00* (2006.01)
*G06F 17/22* (2006.01)
*G06F 17/30* (2006.01)
*G06F 17/21* (2006.01)
*G06T 11/60* (2006.01)

(52) U.S. Cl.
CPC ........ *G06F 17/2247* (2013.01); *G06F 17/218* (2013.01); *G06F 17/30905* (2013.01); *G06T 11/60* (2013.01)

(58) Field of Classification Search
CPC ............ G06F 17/2247; G06F 17/2252; G06F 17/218; G06F 17/2264; G06F 17/227; G06F 17/30905; G06T 11/60; G06T 2210/32
See application file for complete search history.

(56) References Cited

U.S. PATENT DOCUMENTS

| | | | | |
|---|---|---|---|---|
| 6,336,138 B1* | 1/2002 | Caswell | ................. | H04L 41/12 345/440 |
| 6,360,227 B1* | 3/2002 | Aggarwal | ......... | G06F 17/30873 |
| 7,581,173 B1* | 8/2009 | Ferguson | .......... | G06F 17/30899 715/235 |
| 8,234,392 B2* | 7/2012 | Graffagnino | ........ | G06F 17/2205 709/230 |
| 8,856,675 B1* | 10/2014 | Agarawala | ............ | G06F 3/0488 715/777 |

(Continued)

OTHER PUBLICATIONS

Antoine Quint, Scalable Vector Graphics, Jul./Sep. 2003, IEEE MultiMedia, vol. 10, No. 3, pp. 99-102.*

(Continued)

*Primary Examiner* — Laurie Ries
(74) *Attorney, Agent, or Firm* — Staas & Halsey LLP

(57) ABSTRACT

An electronic apparatus and an operating method of a web-platform, the method including: executing a web application in the electronic apparatus; parsing a root layer corresponding to a most significant node having a tree structure for a visual configuration of a web page displayed by the web application; processing the root layer to have less or a reduced amount of data resident in a graphic memory as the web application is executed; and rendering a graphic layer, except the root layer, from the nodes forming the tree structure in real time. Thus, the root layer is processed so that less or reduced data can be resident in the GPU memory, thereby improving the graphic processing performance of the GPU with even a low bandwidth.

20 Claims, 16 Drawing Sheets

(56) References Cited

U.S. PATENT DOCUMENTS

| | | | | |
|---|---|---|---|---|
| 8,878,857 | B2* | 11/2014 | Graffagnino | G06F 17/2205 345/473 |
| 8,913,067 | B1* | 12/2014 | Kokkevis | G06F 9/4443 345/522 |
| 2002/0049603 | A1* | 4/2002 | Mehra | G06F 9/4428 726/3 |
| 2002/0049788 | A1* | 4/2002 | Lipkin | G06F 17/30893 715/236 |
| 2005/0050002 | A1* | 3/2005 | Slotznick | G06F 17/22 |
| 2009/0264102 | A1* | 10/2009 | Parmar | G06Q 30/02 455/411 |
| 2010/0115454 | A1* | 5/2010 | Tuli | H04L 67/04 715/780 |
| 2010/0268694 | A1* | 10/2010 | Denoue | G06F 17/30873 707/693 |
| 2012/0265802 | A1* | 10/2012 | Shen | H04L 67/02 709/203 |
| 2013/0033508 | A1 | 2/2013 | Labour et al. | |
| 2013/0120418 | A1 | 5/2013 | Green et al. | |
| 2013/0147787 | A1* | 6/2013 | Ignatchenko | G06T 11/60 345/419 |
| 2013/0246906 | A1* | 9/2013 | Hamon | G06F 17/2252 715/234 |
| 2014/0089826 | A1* | 3/2014 | Boyd | G06F 3/0481 715/765 |
| 2014/0122729 | A1* | 5/2014 | Hon | H04L 65/1069 709/228 |
| 2015/0006333 | A1* | 1/2015 | Silveira | G06Q 30/0641 705/27.1 |
| 2015/0007022 | A1* | 1/2015 | Chen | G06F 17/3089 715/235 |
| 2015/0032803 | A1* | 1/2015 | Graham-Cumming | H04L 67/2828 709/203 |
| 2015/0089348 | A1* | 3/2015 | Jose | G06F 17/30905 715/234 |
| 2015/0170322 | A1* | 6/2015 | Graffagnino | G06F 17/2205 345/503 |
| 2015/0213632 | A1* | 7/2015 | Trask | G06T 11/60 715/234 |
| 2015/0370439 | A1* | 12/2015 | Val | G06F 17/30 715/830 |

OTHER PUBLICATIONS

Hugo Osornio, et al., Using OpenVG for 2D graphics in auto infotainment displays, Mar. 27, 2013, www.embedded.com.*

* cited by examiner

FIG. 8

```
CSS

@-webkit-keyframes spin {
  from { -webkit-transform:    rotate(0deg)}
  to {   -webkit-transform:    rotate(360deg);} } spinner {
  -webkit-animation-name:             spin;
  -webkit-animation-iteration-count:  infinite;
  -webkit-animation-duration:         4s;}
  stealth toollayer-compressed; usellocalhost_layer.pkm)
                    41                    42
```

FIG. 10

```
                                              CSS
@-webkit-keyframes spin {
    from {   -webkit-transform:      rotate(0deg);}
    to {   -webkit-transform:      rotate(360deg);} } spinner {      -webkit-animation-name:        spin;
                -webkit-animation-iteration-count:        infinite
                -webkit-animation-duration:        4s;
                -stealth rootlayer-compressed /usr/local/root_layer.pkm;} text   { transform:rotate(0deg);
          -webkit-transform:rotate(0deg); }
```

```
                              CSS
@-webkit-keyframes spin {
   from {  -webkit-transform:    rotate(0deg);}
   to {    -webkit-transform:    rotate(360deg);} } spinner {  -webkit-animation-name:       spin;
            -webkit-animation-iteration-count:      infinite
            -webkit-animation-duration:        4s;
            -stealth-rootlayer-openvg:{usr/local/root_layer.svg;}
```

```
CSS

@-webkit-keyframes spin {
    from { -webkit-transform:    rotate(0deg);}
    to { -webkit-transform:      rotate(360deg);} } spinner {  -webkit-animation-name:       spin;
            -webkit-animation-iteration-count:       infinite;
            -webkit-animation-duration:   4s;
            -stealth-rooflayer-hidden:true;} text  { transform:rotate(0deg);
         -webkit-transform:rotate(0deg);          }
```

49    48

RENDERING APPARATUS AND METHOD FOR OPERATING A WEB-PLATFORM

CROSS-REFERENCE TO RELATED APPLICATION

This application claims priority from Korean Patent Application No. 10-2014-0001320, filed on Jan. 6, 2014 in the Korean Intellectual Property Office, the disclosure of which is incorporated herein by reference.

BACKGROUND

1. Field

Apparatuses and methods consistent with the exemplary embodiments relate to an electronic apparatus and an operating method of a web-platform in the same, and more particularly to an apparatus and method for performing a web-platform operation through a rendering process to which hardware acceleration is applied.

2. Description of the Related Art

As a smart phone, a smart TV, or the like smart device, an electronic device has no limit to its functions and may be changed or extended in function through installation of various applications. As an example of such functional extension, a web application for displaying a web content may be installed and driven in the electronic apparatus.

When the web application is executed, a two-dimensional (2D) rendering buffer for drawing the web content is assigned to a graphics processing unit (the GPU) texture buffer, and is composed with a hierarchical tree structure, i.e., with a layer to have an animation effect by a matrix operation, thereby displaying the web content through a frame buffer.

Here, a root layer, which corresponds to a background basically displayed when the web application is executed, occupies about 8 MB of the GPU memory with respect to full high definition (HD) image quality (1920×1080). If a direct rendering technique is not applied, data is resident in not only the GPU memory but also central processing unit (CPU) memory. Therefore, memory of about 16 MB may be occupied.

Thus, a web-platform operation has a structure of invariably occupying the GPU memory, i.e., using the texture buffer while the GPU acceleration technique is applied, whereas the electronic apparatus for driving the web application has a limited hardware structure for the GPU bandwidth as compared with a personal computer (PC) and deteriorates in its performance.

Also, when the web application is executed, the electronic apparatus deteriorates in its performance due to limited operation ability of JAVASCRIPT, high usage of the texture buffer, etc. as compared with those of when a native application is executed.

SUMMARY

An aspect of one or more exemplary embodiments is to provide an image processing apparatus which is capable of reversely displaying an image for user convenience while maintaining readability of additional information displayed along with the image and a control method thereof.

The foregoing and/or other aspects may be achieved by providing a method of operating a web-platform in an electronic apparatus in which at least one application is installed and driven, the method including: executing a web application in the electronic apparatus; parsing a root layer corresponding to a most significant node having a tree structure for a visual configuration of a web page displayed by the web application; processing the root layer to have less or a reduced amount of data resident in a graphic memory as the web application is executed; and rendering a graphic layer except the root layer from the nodes forming the tree structure in real time.

The method may further include storing the root layer as a compressed file, wherein the processing the root layer may include rendering the root layer by loading the stored compressed file.

The method may further include designating a storage path for the compressed file, wherein the processing the root layer may include loading the compressed file from the designated storage path.

The method may further include parsing a text from the root layer, wherein the storing the root layer as the compressed file may include compressing and storing the root layer except the parsed text.

The parsed text may be rendered in real time as being included in the graphic layer.

The processing the root layer may include processing scalable vector graphics (SVG) data.

The method may further include storing the scalable vector graphics data; and designating a storage path for the scalable vector graphics data, wherein the processing the root layer may include loading the scalable vector graphics data from the designated storage path.

The processing the root layer may include using an open vector graphics (openVG) rendering process.

The processing the root layer may include removing the root layer.

The root layer may correspond to a background content of the web page displayed by the web application.

The web page may include a web content given in a form of one among cascading style sheets (CSS), a hypertext mark-up language (HTML), JAVASCRIPT (JS).

According to an aspect of another exemplary embodiment, an electronic apparatus in which at least one application is installed and driven is provided, the electronic apparatus including: a graphic processor configured to process graphic data; a graphic memory configured to store data used in processing the graphic data; and a web engine configured to control the graphic processor to parse a root layer corresponding to a most significant node having a tree structure for a visual configuration of a web page displayed by a web application when the web application is executed in the electronic apparatus, process the root layer to have less data resident in the graphic memory, and render a graphic layer except the root layer from the nodes forming the tree structure in real time.

The root layer may be stored as a compressed file in the electronic apparatus, and the web engine may render the root layer by loading the stored compressed file.

A storage path may be designated for the compressed file in the web page, and the web engine may load the compressed file from the designated storage path.

If the root layer may include a text, the text is parsed from the root layer, and the root layer except the parsed text may be compressed and stored.

The parsed text may be included in the graphic layer and rendered by the web engine in real time.

The web engine may process the root layer as a scalable vector graphics (SVG) data.

The scalable vector graphics data may be stored in the electronic apparatus, and a storage path may be designated for the scalable vector graphics data in the web page, and the web engine may load the scalable vector graphics data from the designated storage path.

The web engine may use an open vector graphics (openVG) rendering process to process the root layer.

The web engine may remove the root layer.

The root layer may correspond to a background content of the web page displayed by the web application.

The web page may include a web content given in a form of one among cascading style sheets (CSS), a hypertext mark-up language (HTML), JAVASCRIPT (JS).

The method of executing a web application in an electronic apparatus may include storing a rendered root layer as a compressed file when the web application is installed, loading and decoding the rendered root layer in a graphic memory as the web application is executed producing the rendered the root layer in the graphic memory, and rendering a graphic layer in real time where the storing stores the compressed file in a preset location. The method may also include, at a time of storing, parsing a root layer into text and a renderable root layer and the storing stores a rendered version of the renderable root layer and includes the text in the graphics layer, so that the graphics layer including the text is rendered in real time. The storing may store the compressed file as scalable vector graphics data rendered responsive to an open graphics rendering process. The root layer may include one of a single color image and a single gradation image. The compressed file may be stored as hidden texture. The compressed file may have an attribute indicating to a user that the root layer will not be rendered unless requested.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 8 and 9 are views for explaining the web-platform operation according to the first exemplary embodiment;

FIGS. 10 and 11 are views for explaining the web-platform operation according to the second exemplary embodiment;

FIGS. 12 and 13 are views for explaining the web-platform operation according to the third exemplary embodiment;

FIGS. 14 and 15 are views for explaining the web-platform operation according to the fourth exemplary embodiment.

DETAILED DESCRIPTION OF EXEMPLARY EMBODIMENTS

Below, exemplary embodiments will be described in detail with reference to accompanying drawings.

Figure 1:
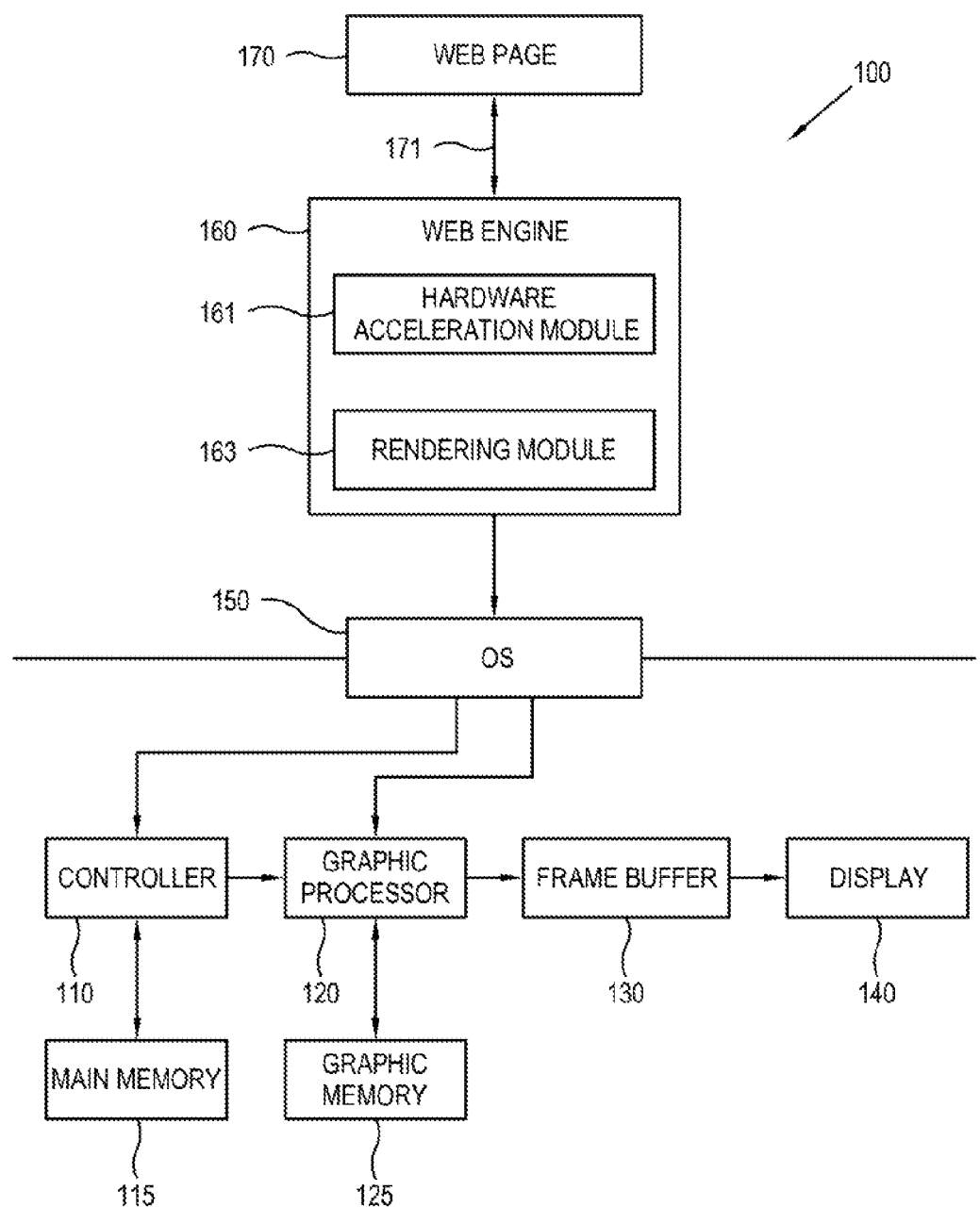
FIG. 1 is a block diagram of an electronic apparatus according to an exemplary embodiment.
Figure 2:
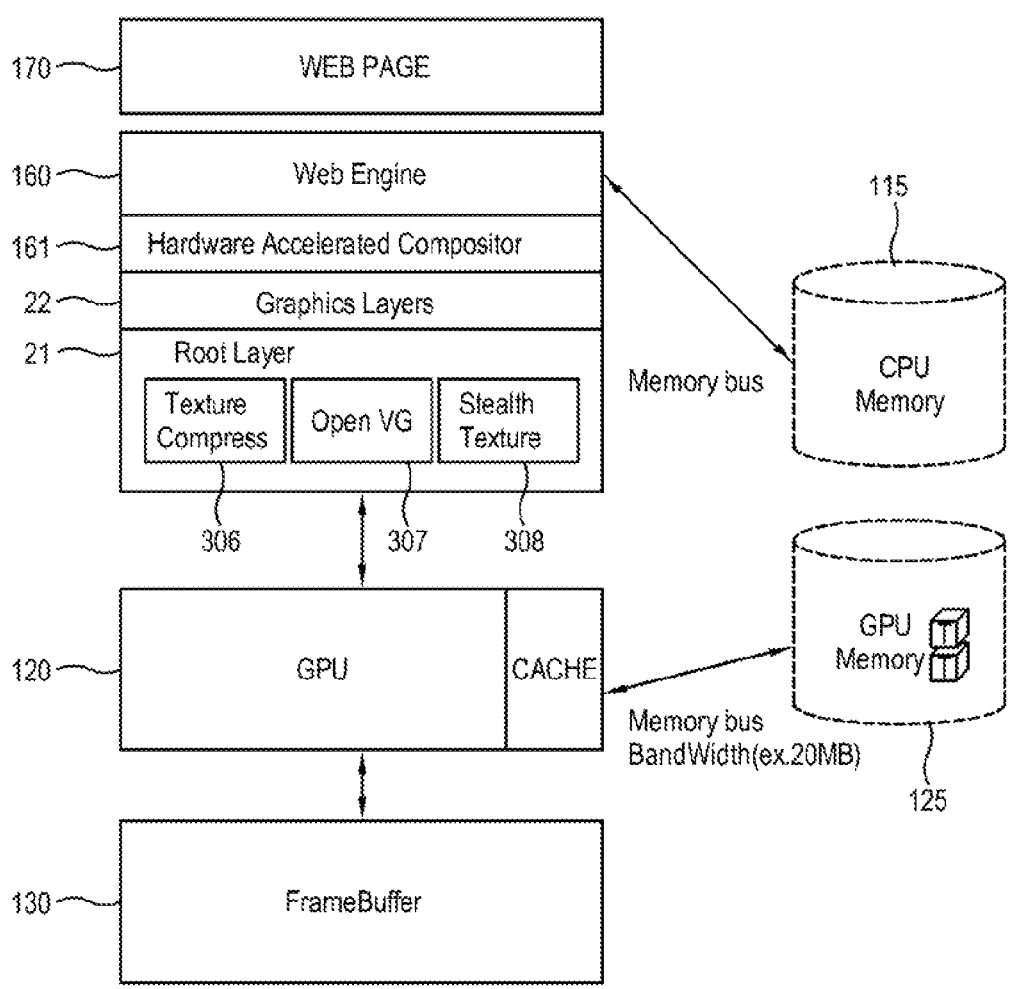
FIG. 2 is a block diagram showing an example where the electronic apparatus of FIG. 1 uses a web engine to process a web page.

FIG. 1 is a block diagram of an electronic apparatus according to an exemplary embodiment, and FIG. 2 is a block diagram showing an example where the electronic apparatus of FIG. 1 uses a web engine to process a web page.

An electronic apparatus 100 may be achieved by various smart devices such as a smart phone, a tablet personal computer (PC), a smart TV, etc., of which functions are extendable through applications.

According to an exemplary embodiment, a web application for web browsing is installed in and driven by an electronic apparatus 100. Here, the web application, which is developed by a developer and released on the market, is distinguished from a native application basically provided in the smart device.

The electronic apparatus 100 receives, processes and displays a plurality of web pages from outside the apparatus in accordance with execution of the web application. Web contents that constitute the web page may be parsed into a plurality of rendering hierarchies, i.e., layers. The electronic apparatus 100 performs hardware acceleration when a certain layer is rendered, and thus displays a visual configuration of the web page.

As shown in FIG. 1 the electronic apparatus 100 according to an exemplary embodiment may include a plurality of software (S/W) components configured to give a command for analyzing and rendering a web page 170 as the web application is executed, and a plurality of hardware (H/W) components configured to execute the generated command and display the web page 170 to a user of the electronic apparatus 100.

The electronic apparatus 100 may receive a plurality of web pages 170 through a network 171 as the web application is executed. The network 171 is achieved by local area networks (LAN), wide area networks (WAN), Intranet, Extranet, Internet, wireless LAN, Wi-Fi, wired communication mechanism, wireless communication mechanism, etc. To this end, the electronic apparatus 100 may be provided with wired and/or wireless communication modules and combination thereof to support various networks.

The web page 170 received in the electronic apparatus 100 may be provided to a web engine 160 for web browsing of the web application.

The web engine 160 includes a hardware acceleration module 161, and a rendering module 163 as shown in FIG. 1.

The rendering module 163 parses the web page 170 into configuration elements and renders visual presentation of the configuration elements. The rendering may be performed by a graphic application programming interface (API) that issues a command usable in displaying two-dimensional (2D) and three-dimensional (3D) computer graphics through hardware components, in which the graphic API may be "OPENGL". Also, at a time of rendering, hardware acceleration may be performed under control of the hardware acceleration module 161.

In a web-platform forming an early web browser, a method of directly outputting a frame buffer using a CPU 110 such as 2D rendering has been used. However, in recent web browsers, a 3D rendering technique using a fast GPU has been introduced and utilized in processing a frequently changed part or processing an animation effect, a web game, etc. These are controlled on the web content, and defined as a CSS3 (Cascading Style Sheets 3) Transform, Accelerated Compositor 2D Canvas, and WebGL techniques. In this exemplary embodiment, a set of web engine techniques for enabling the foregoing will be called an accelerated compositor or a hardware accelerated compositor.

The web engine 160 interfaces with the hardware components through an operating system (OS) 150. The operating system 150 may include ANDROID, iOS, WINDOWS, etc., and various drivers for an interface between hardware and software.

As shown in FIG. 1, the electronic apparatus 100 includes hardware components such as a controller (hereinafter, also referred to as a 'CPU') 110, a main memory (hereinafter, also referred to as a 'CPU memory') 115, a graphic processor (hereinafter, also referred to as a 'GPU') 120, a graphic memory (hereinafter, also referred to as a 'GPU memory') 125, a frame buffer 130 and a display 140.

The controller 110 is achieved by a central processing unit (CPU) or the like general-purpose processor, and the graphic processor 120 may be achieved by a graphics processing unit (the GPU) or the like dedicated processor. The GPU 120 may include a plurality of cores such as 2D and/or 3D cores for processing different-type graphic data, and may use various kinds of graphic resources.

The output of the GPU 120 may be stored in the graphic memory 125 so as to be displayed on the display 140. For example, the GPU 120 may use the graphic memory 125 as a dedicated memory for storing information used in a graphic process. Meanwhile, the CPU 110 may employ the main memory 115 shared with other components of the electronic apparatus 100.

The exemplary embodiment of FIG. 1 shows an example where the electronic apparatus 100 includes a separate graphic memory 125 to store the data used in the process of the GPU 120, but is not limited thereto. Alternatively, the graphic memory 125 may not be provided, in other words, the GPU 120 may use the main memory 115 to store data. Also, the graphic memory 125 may be achieved in the form of cache internally provided in the GPU 120 to be described later as shown in FIG. 2.

The web page processed and composed in the GPU 120 is a drawing image file, which is transmitted to the frame buffer 130 and displayed on the display 140. There is no limit to the types of the display 140. As a flat panel display (FPD), the display 140 may be achieved by various display types such as liquid crystal, plasma, a light-emitting diode (LED), an organic light-emitting diode (OLED), a surface-conduction electron-emitter, a carbon nano-tube, nano-crystal, etc.

As shown in FIG. 2, in the electronic apparatus 100 according to an exemplary embodiment, the web engine 160 parses the web page into at least one graphic layer and a root layer.

FIGS. 3 to 6 are views for explaining general procedures of processing the web page.

Figure 3:
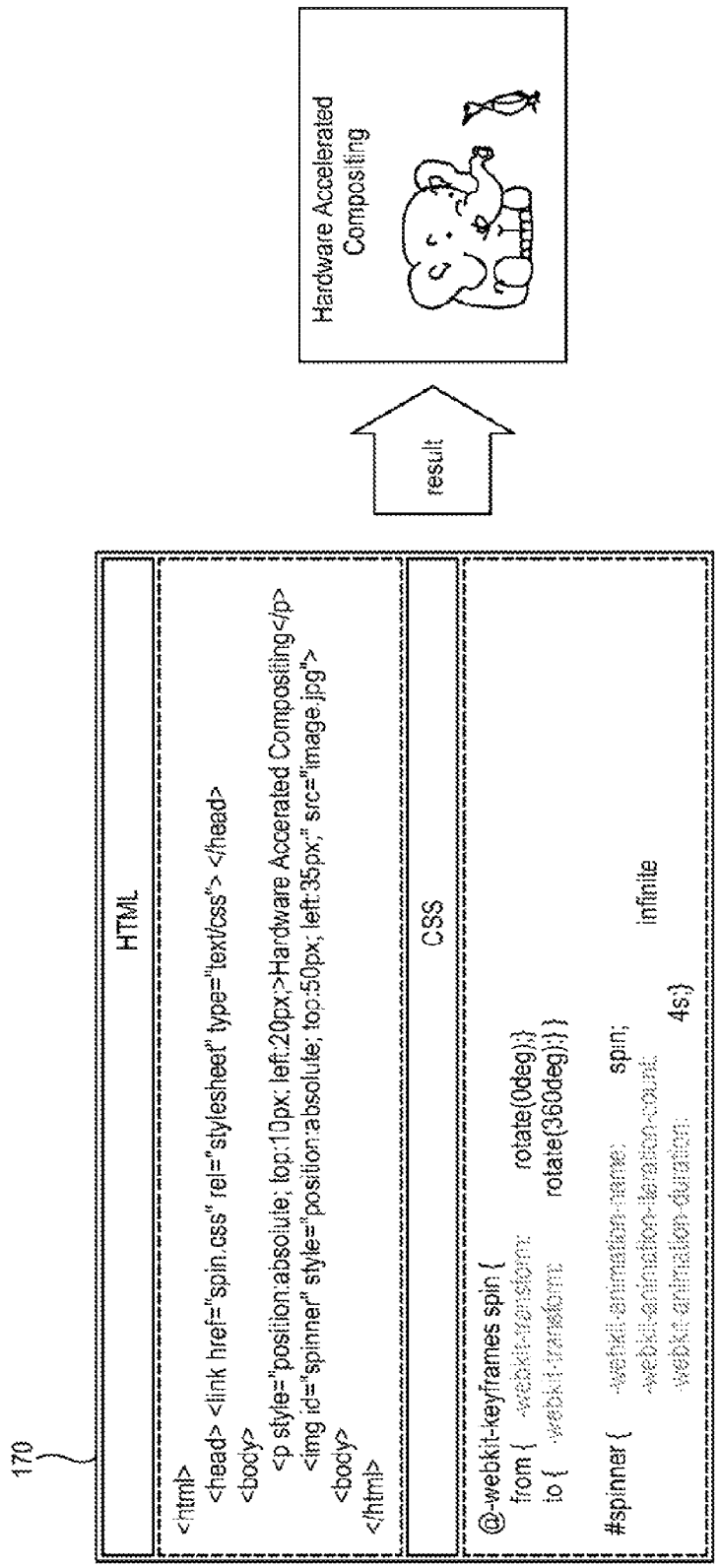
FIGS. 3 to 6 are views for explaining general procedures of processing the web page.

As shown in FIG. 3, the web page 170 is web content given or provided in the form of a hypertext mark-up language (HTML), cascading style sheets (CSS), JAVASCRIPT (JS), etc., which is displayed as a web content image resulting from hardware accelerated compositing by the web engine 160.

The web engine 160 discriminates the web page 170 by a walk-through process with regard to a plurality of style sheets, and determines style patterns, display order, etc., thereby displaying the web page 170 on the display 140. In this exemplary embodiment, the walk-through process is applied to a formatting command in the CSS with regard to the web page 170, thereby determining the display of the web page 170. The style sheet may be provided in a CSS language.

CSS3 refers to one of HTML5 standards, which can display a more elaborate and splashier screen than that of CSS2 or CSS1, and support an animation. In general, there is an advantage that 2D/3D transformation function of the CSS3 is used to control layers in content. In this exemplary embodiment to be described below, the web page 170 is web content based on the CSS3 and extended in function so as to be compatible with the existing contents, but not limited thereto. For example, the web page may alternatively include a new HTML tag or JAVASCRIPT as well as that based on the CSS3.

Figure 4:
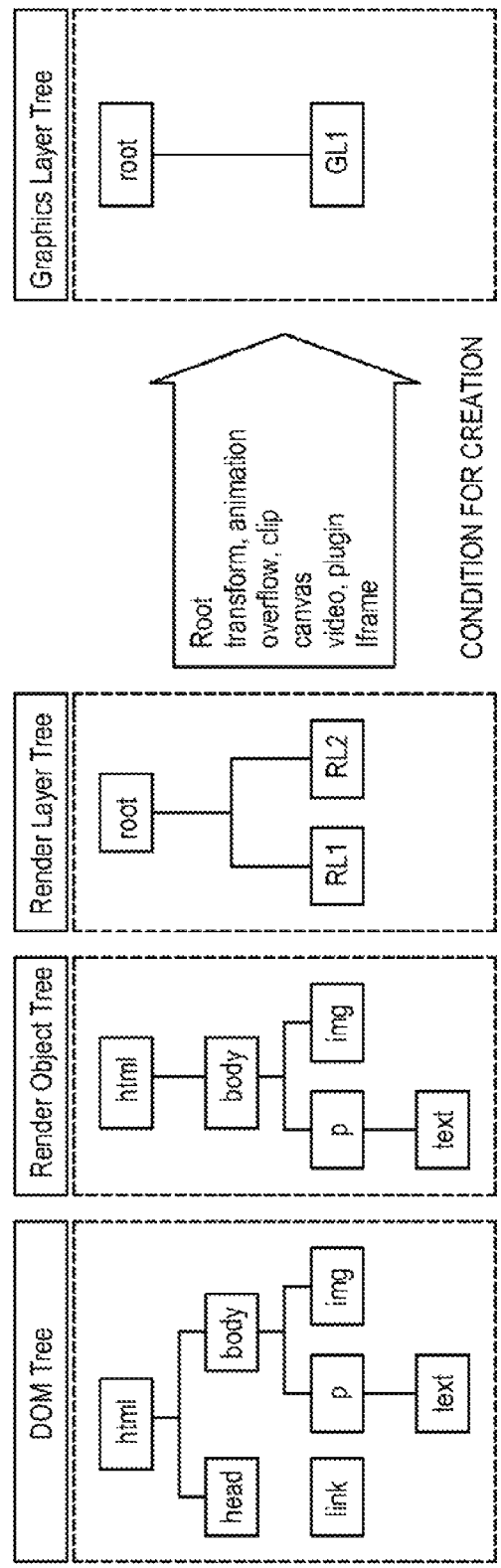

As shown in FIG. 4, the web page 170 has a structure of a document object model (DOM) tree including a plurality of nodes. Visual configuration displayed in this DOM tree structure, that is, nodes corresponding to a text and image img are extracted to thereby form a render object tree. Further, an abstract render object layer based on a coordinate space is transformed into a render layer tree as shown in FIG. 4 and transformed again into a graphic layer tree using physically parsed buffers.

As compared with the render layer tree, the graphics layer tree includes physically parsed buffers used by respective nodes. The graphics layer corresponds to physical buffers to be used for rendering on the web browser, and the respective buffers have a z-order and thus can be composed in the form of a tree. The compositing and rendering of the graphics layer are performed by the rendering module 163 of FIG. 1, and OPENGL ES may be used as shown in FIG. 5.

Figure 5:
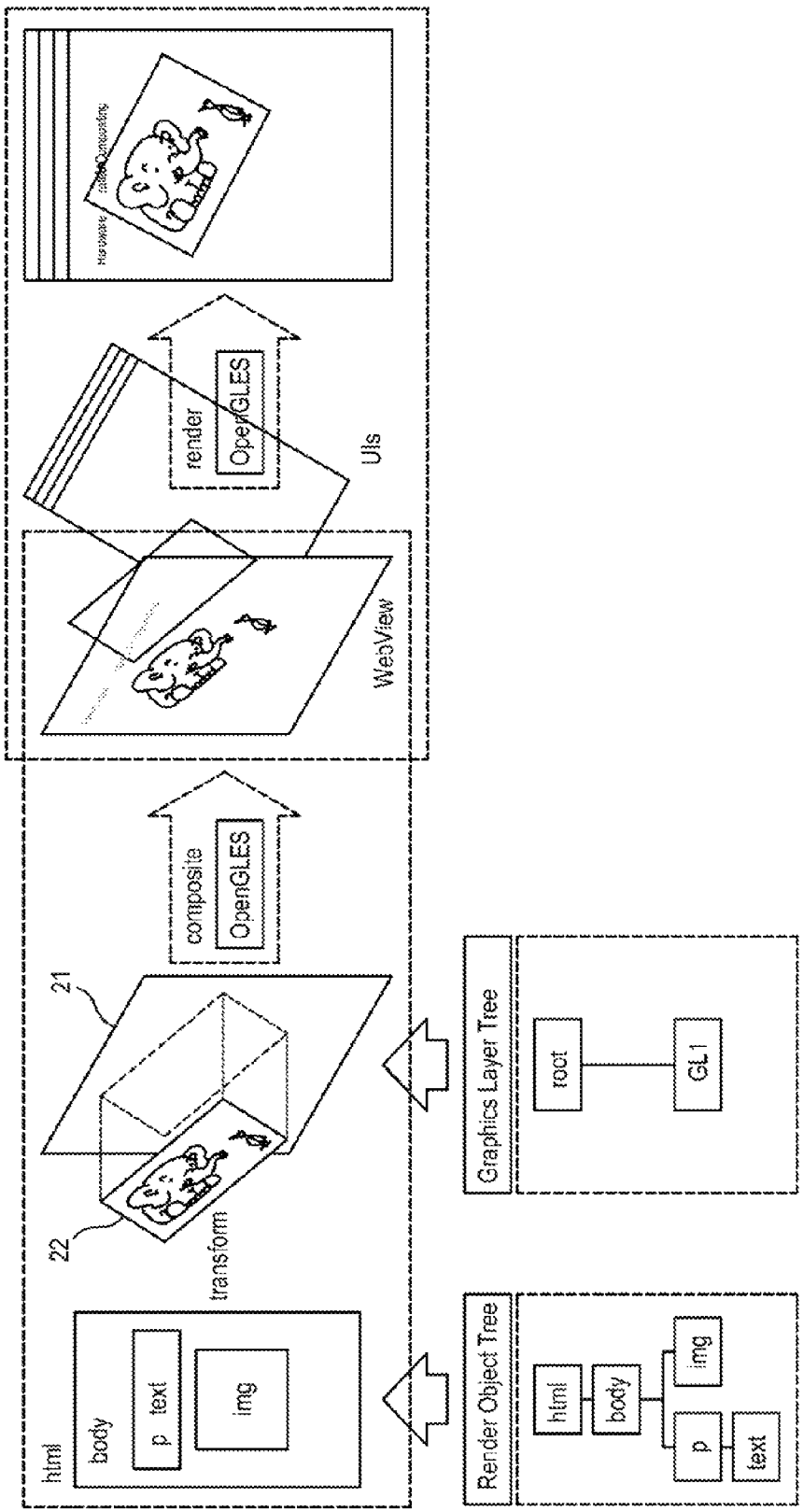
Figure 6:
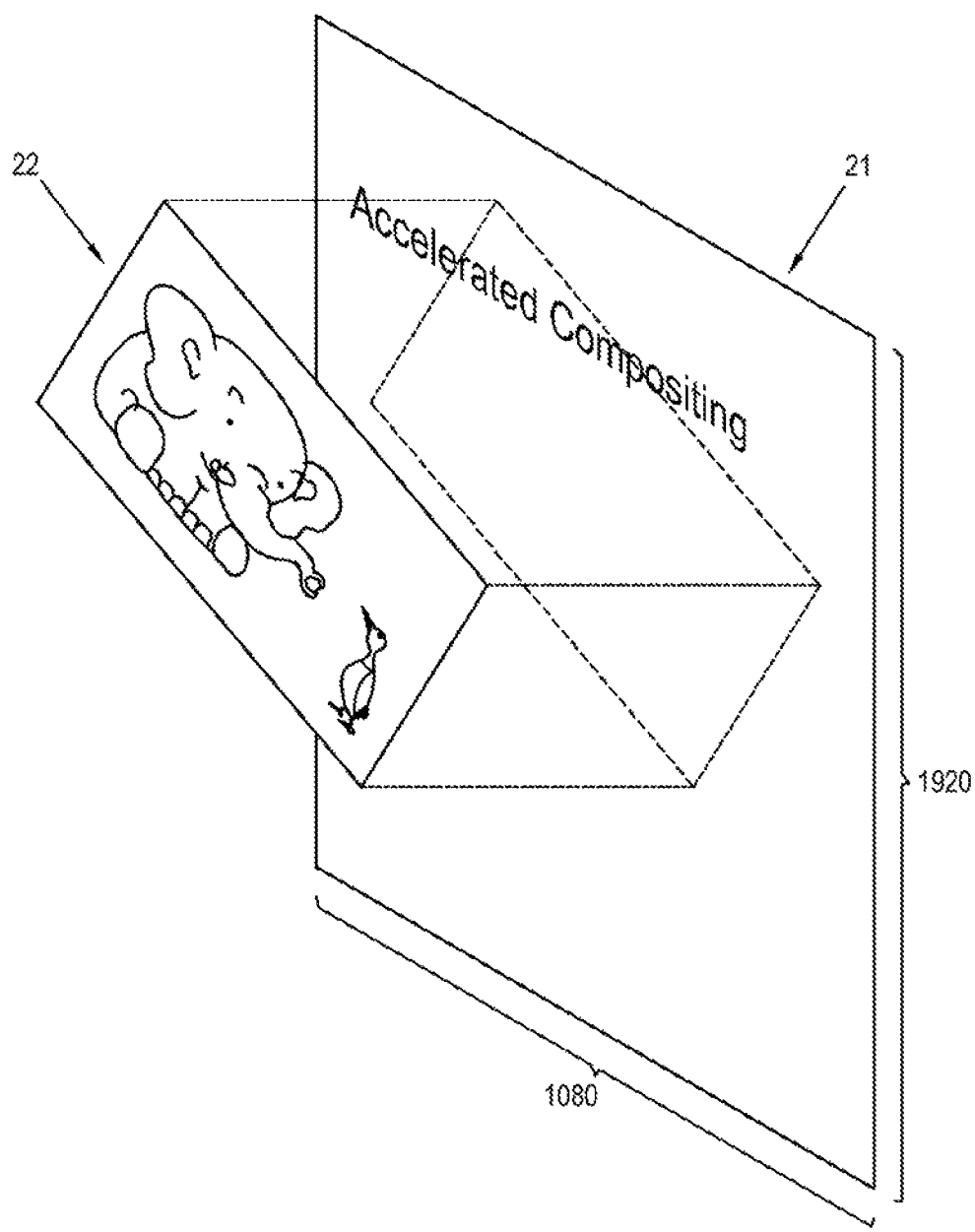

As shown in FIGS. 5 and 6, the graphics layer tree includes a root layer (root) and the graphics layer (GL1). The root layer may be the most basic part of the web page 170, for example, a background content, and corresponds to the most significant node. In the web page, the root layer is an unconditionally drawn part, and assigned with a separate physical space, i.e., a buffer even when it is covered with another layer and not shown. Mostly, the root layer is not changed while the web application is running.

In this exemplary embodiment, the root layer may be assigned with a titled texture. The texture refers to a buffer provided in the GPU 120, in which a result of rendering software, a result of uploading an image file, etc. performed by the web browser is stored, and the GPU 120 applies compositing and finally outputs to the frame buffer 130. Therefore, if a total texture size increases, a smart phone and the like mobile device or a smart TV having a limited processing capacity of the GPU memory 125, i.e., in a bandwidth may deteriorate in its performance.

Specifically, referring to FIGS. 5 and 6, the root layer root is composed with the graphics layer GL1 under control of the GPU 120, and then transmitted to the frame buffer 130 so as to be finally displayed as an image on the display 140. During the compositing of the GPU 120, the smaller the size of the textures, the higher the efficiency of the rendering. As shown in FIG. 6, the root layer occupies about 8 MB of the GPU memory 125 at a resolution of 1920×1080, and this may affect a use bandwidth between the GPU 120 and the GPU memory during the rendering. If it is considered that the optimal texture bandwidth of the GPU used in the smart TV and the mobile device is generally limited to about 20 MB, the performance of the GPU may be very largely affected by 8 MB of data.

Below, exemplary embodiments will be described in more detail with reference to the accompanying drawings.

Figure 7:
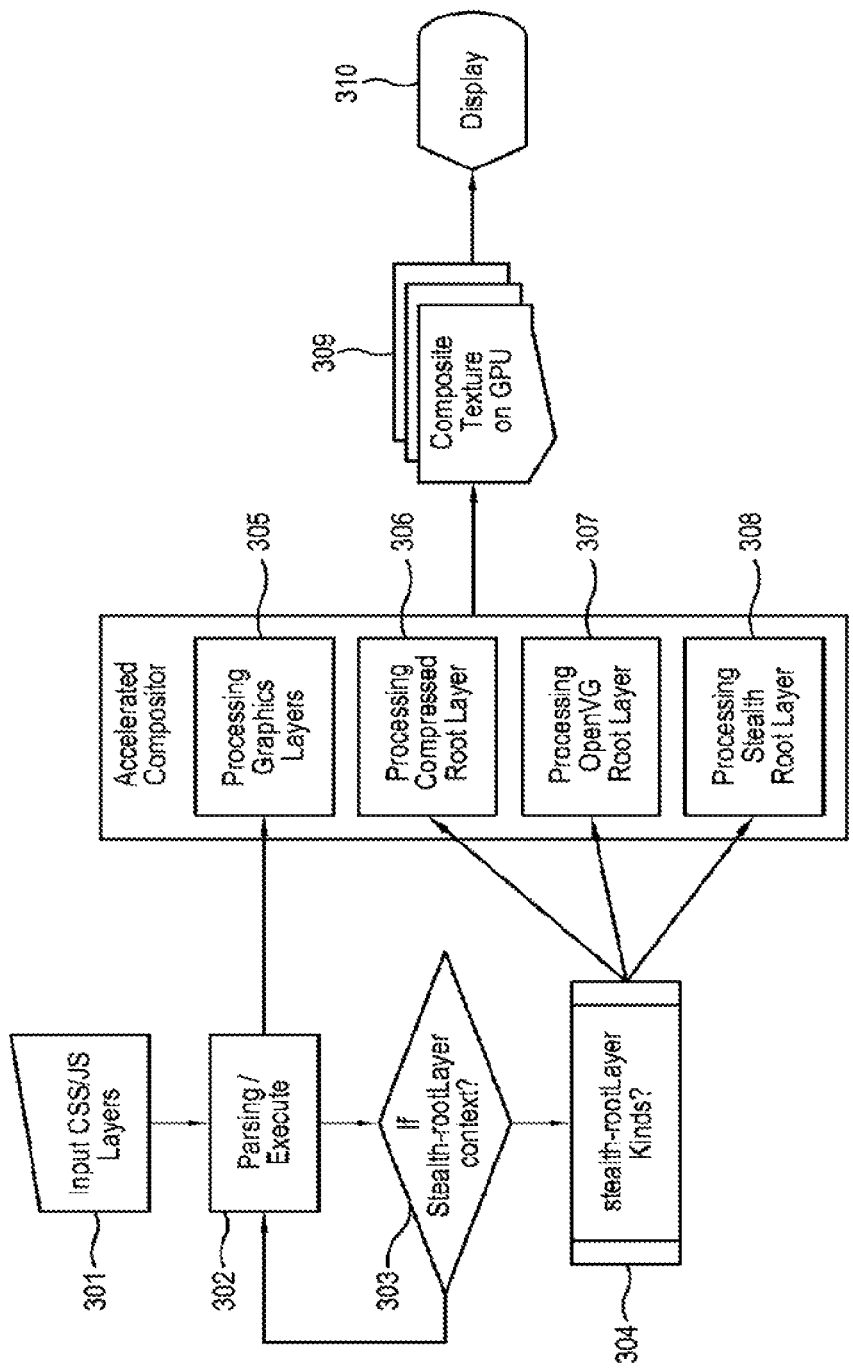
FIG. 7 is a flowchart of a web-platform operation according to first to fourth exemplary embodiments.

FIG. 7 is a flowchart of a web-platform operation according to first to fourth exemplary embodiments.

As shown in FIG. 7, the electronic apparatus 100 receives the web page 170 from the outside in accordance with execution of the web application, and receives CSS/JS codes that constitute the corresponding web page (301).

The electronic apparatus 100 parses and executes the received web page 170 according to elements, i.e., layers (302). Here, the web engine 160 analyzes the graphics layer tree formed as a hierarchical tree structure for the visual configuration of the web page 170, and parses the web page 170 into a root layer corresponding to the most significant node and a graphics layer corresponding to nodes except that of the root layer.

Such a parsed graphics layer is processed under control of the web engine 160 (305). Specifically, the graphics layer is rendered in real time during a running time that the web page 170 is received from the outside, processed and displayed.

If it is determined that the root layer is processed as being discriminated from the graphics layer in the executed web application (303), the electronic apparatus 100 determines the kinds of web-platform operation as a method of processing the root layer (304). Here, the method of processing the root layer may be previously set up by a developer of the corresponding web application before release.

Then, the web engine 160 processes the root layer in accordance with one among plural processing methods 306, 307 and 308. Here, the method of processing the root layer may be one among processing a compressed root layer (306), processing an open VG root layer (307), and a stealth root layer (308), and each processing method will be described in more detail with reference to the following first to fourth exemplary embodiments. According to the first to fourth exemplary embodiment, each of the methods 306, 307 and 308 of processing the root layer decreases the use bandwidth corresponding to the data resident in the GPU memory 125.

The textures corresponding to the root layer and graphics layer processed in the web engine 160 are composited under control of the GPU 120 (309), and displayed on the display 140 via the frame buffer 130 (310).

First Exemplary Embodiment, Compressed Root Layer (306)

Figure 9:
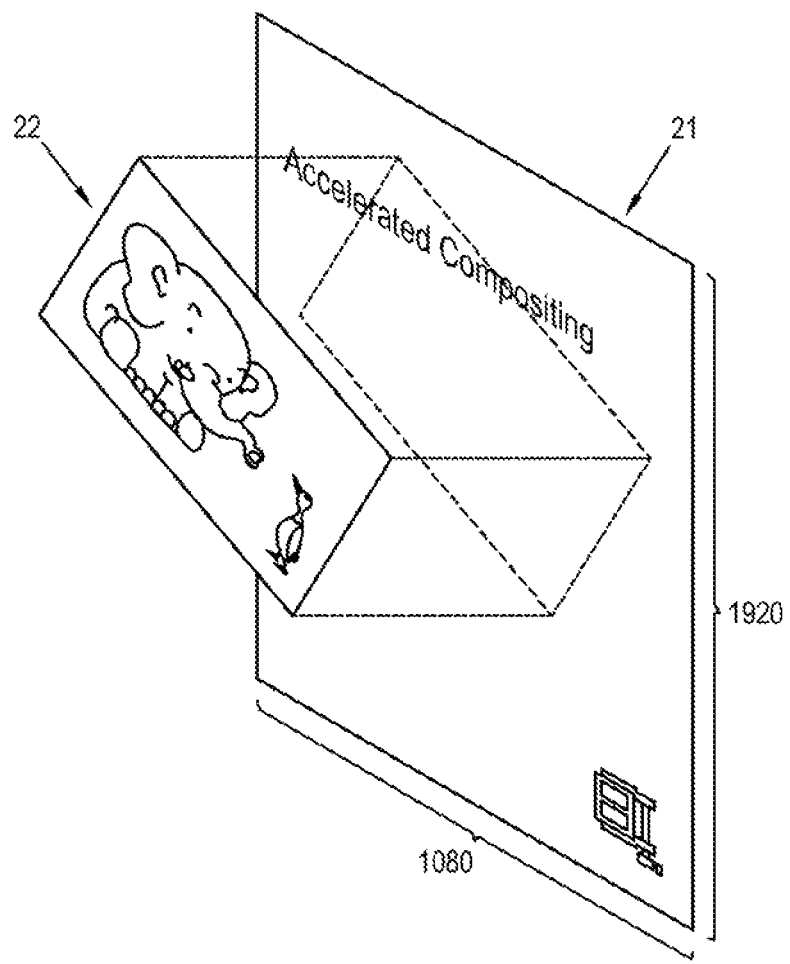

FIGS. 8 and 9 are views for explaining the web-platform operation according to the first exemplary embodiment.

As shown in FIG. 9, the electronic apparatus 100 according to the first exemplary embodiment previously stores the root layer 21 as a compressed file, and loads the stored compressed file when the web application is executed, thereby rendering the root layer 21. Here, the graphics layer 22 is rendered in real time during the running time.

In this exemplary embodiment, if a user selects the web application to be downloaded in the electronic apparatus 100, it is possible to store the compressed file corresponding to the root layer 21 in a preset location when the corresponding web application is installed. Further, if the previously installed web application is executed, the previously stored compressed file is loaded in accordance with a web content of the web page 170 downloaded from the outside, thereby rendering the root layer 21.

To this end, as shown in FIG. 8, a path 42 where the compressed file is stored is previously designated in a CSS file forming the downloaded web page 170. Specifically, the CSS file is designed to add an attribute 41 of "-stealth-rootlayer-compressed", and designate the path 42 of the compressed file.

The texture compression is used in a game or other graphic programs, which refers to a technique used in decreasing the total texture size by assigning the compressed texture to the texture buffer of the GPU 120. Further, encoding does not occur in the running time, but may be previously processed in a PC or workstation so that the processed results are uploaded to the GPU 120 in the running time. Also, decoding is performed in the GPU 120, and the bandwidth usage between the GPU 120 and the GPU memory 125 is effectively decreased since the texture is resident in the GPU memory 125 as being compressed, thereby improving a decoding speed of the GPU 125.

In such a method of compressing the texture buffer, the root layer is previously compressed and stored in accordance with a preset algorithm, and the GPU 120 loads, i.e., uploads the compressed file from the designated path and decodes the compressed file through the corresponding algorithm. Thus, as shown in FIG. 9, the compressed file of the root layer occupies about 1 MB of the texture, which is decreased as compared with 8 MB occupied in the existing real-time rendering.

The web engine 160 analyzes the attribute of the CSS file, and performs rendering based on the compressed texture instead of the existing rendering of the root layer.

The web-platform operation according to the first exemplary embodiment is mainly applied when the root layer is not frequently changed. If there is a change in the root layer, it may be changed to have an attribute of JAVASCRIPT and then changed into a new compressed file. Also, the web-platform operation is achieved in such a manner of adding the attribute of the CSS, and therefore the existing operation is also allowed in the web browser to which the first exemplary embodiment is not applicable. Accordingly, content compatibility is secured.

Second Exemplary Embodiment, Floating Layer and Compressed Root Layer (306)

Figure 11:
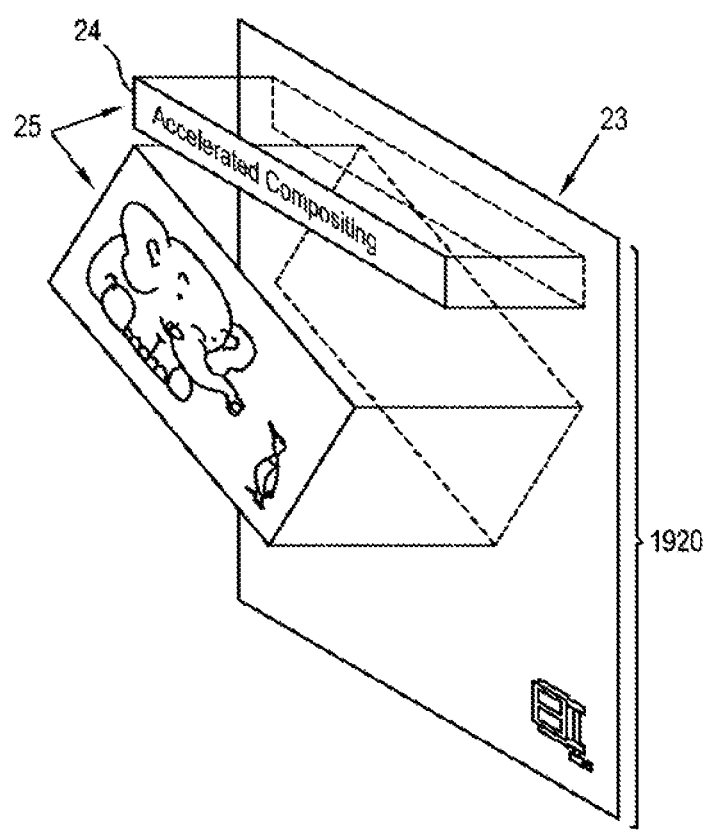

FIGS. 10 and 11 are views for explaining the web-platform operation according to the second exemplary embodiment.

The second exemplary embodiment is different from the first exemplary embodiment in that a text 24 included in the root layer is parsed and the root layer 23 except for the parsed text is previously stored as a compressed file. Thus, the second exemplary embodiment is involved in the method 306 of using the compressed root layer of FIG. 7.

As shown in FIG. 11, the electronic apparatus 100 according to the second exemplary embodiment previously stores the root layer 23 except the text 24 as a compressed file, and loads the stored compressed file when the web application is executed, thereby rendering the root layer 23. The parsed text 24 may be included in the graphics layer 25. The graphics layer 25 including the text 24 is rendered in real time during the running time.

In this exemplary embodiment, similarly to the first exemplary embodiment, if a user selects the web application to be downloaded in the electronic apparatus 100, it is possible to store the compressed file corresponding to the root layer 23 in a preset location when the corresponding web application is installed. Further, if the previously installed web application is executed, the previously stored compressed file is loaded in accordance with a web content of the web page 170 downloaded from the outside, thereby rendering the root layer 23.

To this end, as shown in FIG. 10, a path 44 where the compressed file is stored is previously designated in a CSS file forming the downloaded web page 170. Specifically, the CSS file is designed to add an attribute 43 of "-stealth-rootlayer-compressed", and designate the path 44 of the compressed file. Also, the CSS file according to the second exemplary embodiment is designed to render the text 24 in real time, like the graphics layer 25 (45).

In such a method of compressing the floating layer and the texture, the root layer 23 except the text 24 is previously compressed and stored in accordance with a preset algorithm, and the GPU 120 loads the compressed file from the designated path and decodes the compressed file through the corresponding algorithm. Thus, as shown in FIG. 11, the compressed file of the root layer occupies about 1 MB of the texture, which is decreased as compared with 8 MB occupied in the existing real-time rendering.

The web engine 160 analyzes the attribute of the CSS file, and performs rendering based on the compressed texture instead of the existing rendering of the root layer.

The web-platform operation according to the second exemplary embodiment is mainly applied when the root layer includes frequently changed elements, for example, when contexts are frequently changed on the background. Like the first exemplary embodiment, if there is a change in the root layer, it may be changed to have an attribute of JAVASCRIPT and then changed into a new compressed file. Also, the web-platform operation is achieved in such a manner of adding the attribute of the CSS, and therefore the existing operation is also allowed in the web browser to which the second exemplary embodiment is not applicable. Accordingly, it is possible to secure content compatibility.

Third Exemplary Embodiment, OpenVG Root Layer (307)

Figure 13:
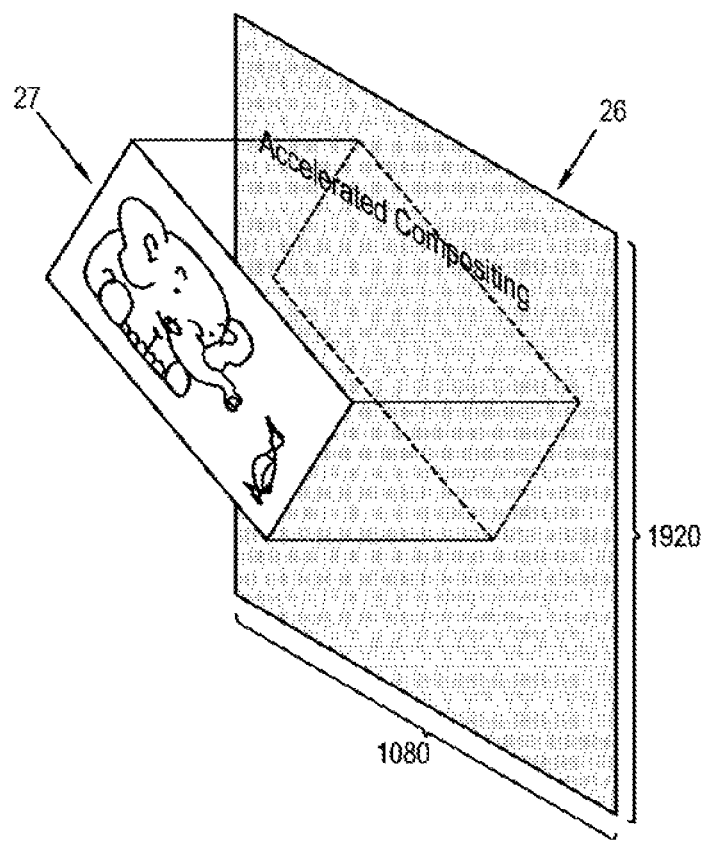

FIGS. 12 and 13 are views for explaining the web-platform operation according to the third exemplary embodiment.

As compared with the first to second exemplary embodiments, the third exemplary embodiment is characterized in compensating for deterioration in image quality that may be caused by the compressed root layer.

OpenVG, that is, scalable vector graphics (SVG) refers to a technique of displaying 2D vector graphics as data in the form of an extensible mark-up language (XML), which can more quickly process drawing elements through the GPU 120 with regard to single-color or gradation for the background rather than image data. Similarly to the texture compressing method, there is an advantage of very quickly processing the drawing since only the data is transmitted.

As shown in FIG. 13, the electronic apparatus 100 according to the third exemplary embodiment processes the root layer 26 as SVG data, in which the SVG data is separately stored and loaded in accordance with the execution of the web application, and the root layer 26 corresponding to the loaded SVG data is rendered using an open vector graphics (OpenVG) rendering process. The graphics layer 27 is rendered in real time during the running time.

To this end, as shown in FIG. 12, a path 47 to which the SVG data is stored is previously designated to the CSS file forming the web page 170. Specifically, the CSS file is designed to allow a developer to declare "-stealth-rootlayer-openvg" 46 and designate the path 47 of the SVG file. The SVG data may be separately stored at a location corresponding to this path of the electronic apparatus 100.

The web engine 160 analyzes the attribute of the CSS file, and performs rendering of the root layer based on the OpenVG rendering process instead of the existing rendering of the root layer.

Here, the transmitted SVG data occupies an extremely small memory (about 300 KB) due to its characteristic as shown in FIG. 13, which is decreased as compared with 8 MB occupied in the existing real-time rendering.

The web-platform operation according to the third exemplary embodiment is mainly applied when the root layer is a background content having a single-color or gradation. On the other hand, if the background itself is an image having a format of Bitmap, JPEG, PNG, etc., this web-platform operation may more deteriorate in its performance than the texture compressing method.

Fourth Exemplary Embodiment, Hidden Root Layer (308)

Figure 15:
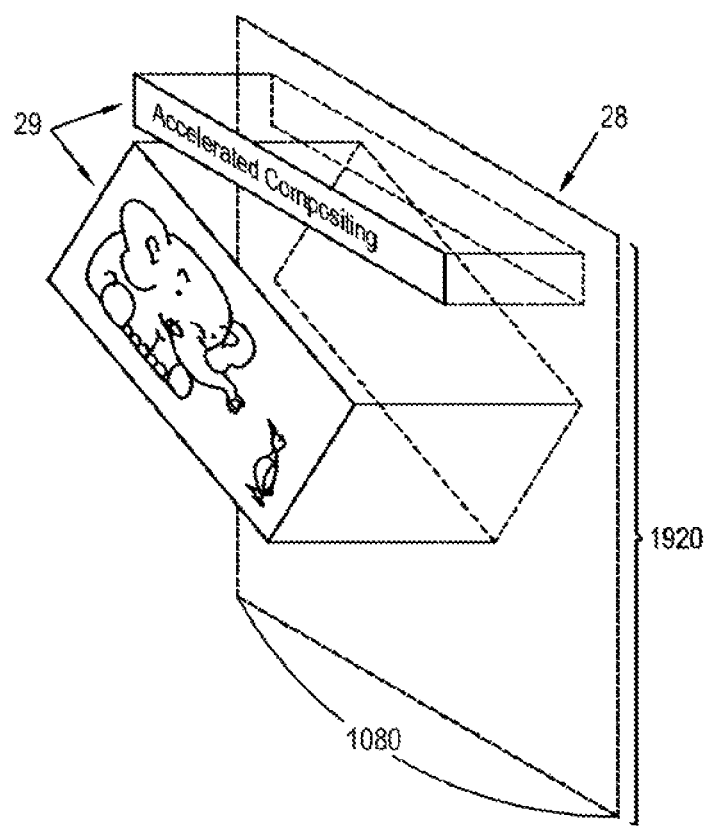

FIGS. 14 and 15 are views for explaining the web-platform operation according to the fourth exemplary embodiment.

As compared with the first to third exemplary embodiments, the fourth exemplary embodiment can secure the maximum performance, which is characterized in excluding the root layer 28 from rendering targets. The excluded root layer 28 is processed as a hidden texture (i.e., a stealth texture).

As shown in FIG. 15, the electronic apparatus 100 according to the fourth exemplary embodiment removes the root layer 28, and renders only the graphics layer 29 in real time during the running time.

To this end, as shown in FIG. 14, the CSS file forming the web page 170 is designed to be assigned with an attribute 48 of "-stealth-rootlayer-hidden: true" so that a developer can make a decision to give up the root layer. Here, as shown in FIG. 15, if the background includes a text, the CSS file is designed to render the text in real time like the graphics layer 29 (49).

This fourth exemplary embodiment may be applied when the background of the web page 170 is transparent or white, or when only the graphics layer is enough to represent the web page. For example, if the background of a content is provided not on the root layer but on the graphics layer, that is, if the web-platform has a structure where the graphics layer entirely covers the root layer, the root layer is actually rendered to be transparent or white and thus the texture is provided in the GPU memory 125, thereby wastefully occupying the memory.

Thus, in this case, if the root layer is removed, the memory occupied by the root layer 28 as shown in FIG. 15 approximates 0 in practice, thereby improving performance. Specifically, in the case of WebGL or Canvas2D, most of contents have a separate canvas background, and it is therefore possible to expect the improvement in performance based on the removal of the root layer.

Referring back to FIG. 7, the electronic apparatus 100 according to an exemplary embodiment determines whether there is a stealth-rootlayer context (303) as a result of parsing and executing the web page 170 containing the CSS or the like (302). Further, the kinds of stealth-rootlayer is determined, i.e., it is determined whether the root layer is compressed 41, openVG 46 or hidden 48, thereby processing the root layer in accordance with one among the web-platform operations 306, 307 and 308. Here, if there is a text in the web page 170 containing the CSS or the like, the text is discriminated or recognized and then rendered in real time as being included in the graphics layer.

Further, the graphics layer excluding the root layer from the nodes of the visual configuration is rendered in real time.

Thus, the textures corresponding to the root layer and the graphics layer processed in the web engine 160 are composited under control of the GPU 120 (309), and displayed on the display via the frame buffer 130 (310).

Figure 16:
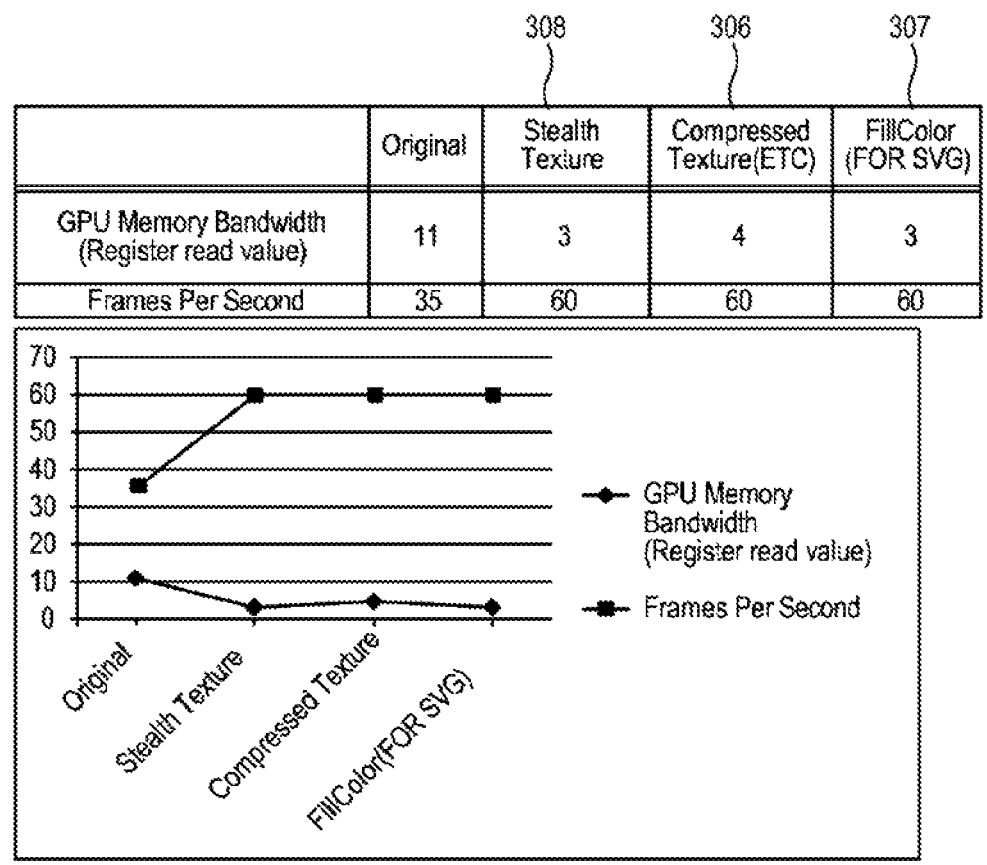
FIG. 16 is a view showing test results of the web-platform operation according to an exemplary embodiment as compared with those of a conventional operation.

FIG. 16 is a view showing test results of the web-platform operation according to an exemplary embodiment as compared with those of a conventional operation.

The test results of FIG. 16 were acquired from measurement by selecting one exercise, i.e., CSS3 3D-transform contents in a RM-based SOC board. The GPU memory bandwidth is read from a value of the GPU register. Because the value (MB) of the GPU memory bandwidth corresponds to the amount of occupied memory, the smaller the better. Also, frames per second (FPS) refers to a value indicating how many times each frame is drawn per second while the GPU performs the rendering. With regard to the value of FPS, the greater the better.

Accordingly, the processing performance of the case where the root layer is processed by the compressed texture, the SVG data or the stealth texture according to an exemplary embodiment is more improved than that of an original case where the root layer is rendered in real time during the running time.

Thus, according to an exemplary embodiment, while processing the web page caused by execution of the web application, the root layer is processed so that less or reduced data can be resident in the GPU memory, thereby improving the graphic processing performance of the GPU with even a low bandwidth. For instance, it is possible to expect an effect on improvement in the web-platform graphic performance by about 30% or higher.

Accordingly, a user of the web application can experience soft and various user experience (UX) animation effects and high graphic effects of a native application level. Further, a user can smoothly play a game without discontinuity.

Also, a developer of the web application can select options to process the root layer in order to improve the performance of the GPU memory, thereby developing and releasing various applications consistent with his/her intentions.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the encoding apparatus and decoding apparatus described herein.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

The invention claimed is:

1. A method of operating a web-platform in an electronic apparatus, the method comprising:
   receiving data of a web page from a server;
   compressing a root layer of the web page based on the received data of the web page to generate a compressed file;
   storing the compressed file in a memory;
   rendering a graphic layer of the web page based on the received data of the web page;
   decoding the compressed file and rendering the root layer decoded from the compressed file, and
   composing the rendered root layer and the rendered graphic layer in a frame.

2. The method according to claim 1, further comprising designating a storage path for the compressed file, wherein rendering comprises loading the compressed file of the storage path.

3. The method according to claim 1, further comprising parsing text from the root layer, wherein the storing the compressed file comprises compressing and storing the root layer except the text.

4. The method according to claim 3, wherein the text is rendered in real time as included in the graphic layer.

5. The method according to claim 1, wherein the rendering comprises processing scalable vector graphics (SVG) data.

6. The method according to claim 5, further comprising:
   storing the scalable vector graphics data; and
   designating a storage path for the scalable vector graphics data,
   wherein the rendering comprises loading the scalable vector graphics data of the storage path.

7. The method according to claim 5, wherein the rendering comprises using an open vector graphics (openVG) rendering process.

8. The method according to claim 1, wherein the rendering comprises removing the root layer.

9. The method according to claim 1, wherein the root layer corresponds to background content of the web page.

10. The method according to claim 1, wherein the web page comprises web content provided in a form of one of cascading style sheets (CSS), and a hypertext mark-up language (HTML).

11. An electronic apparatus, the electronic apparatus comprising:
   a graphic processor configured to process graphic data;
   a graphic memory configured to store data used in processing the graphic data; and
   a web engine configured:
   to compress a root layer of a web page based on data of the web page received from a server for generating a compressed file,
   to store the compressed file in the graphic memory, and
   to control the graphic processor to render a graphic layer of the web page based on the received data of the web page, decode the compressed file, render the root layer decoded from the compressed file, and compose the rendered root layer and the rendered graphic layer in a frame.

12. The electronic apparatus according to claim 11, wherein
a storage path is designated for the compressed file in the web page, and
the web engine loads the compressed file of the storage path.

13. The electronic apparatus according to claim 11, wherein if the root layer comprises a text, the text is parsed from the root layer, and the root layer, except the text, is compressed and stored.

14. The electronic apparatus according to claim 13, wherein the text is included in the graphic layer and rendered by the web engine in real time.

15. The electronic apparatus according to claim 11, wherein the web engine processes the root layer as scalable vector graphics (SVG) data.

16. The electronic apparatus according to claim 15, wherein the scalable vector graphics data is stored in the electronic apparatus, and a storage path is designated for the scalable vector graphics data in the web page, and the web engine loads the scalable vector graphics data of the storage path.

17. The electronic apparatus according to claim 15, wherein the web engine uses an open vector graphics (openVG) rendering process to process the root layer.

18. The electronic apparatus according to claim 11, wherein the web engine removes the root layer.

19. The electronic apparatus according to claim 11, wherein the root layer corresponds to a background content of the web page.

20. The electronic apparatus according to claim 11, wherein the web page comprises web content provided in a form of one of cascading style sheets (CSS), and a hypertext mark-up language (HTML).

* * * * *